US007031073B2

(12) United States Patent
Ho et al.

(10) Patent No.: US 7,031,073 B2
(45) Date of Patent: Apr. 18, 2006

(54) ZOOM LENS FOR DIGITAL IMAGE CAPTURING APPARATUS

(75) Inventors: Gung-Hsuan Ho, Hsinchu (TW); Chir-Weei Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/994,407

(22) Filed: Nov. 23, 2004

(65) Prior Publication Data

US 2006/0034000 A1 Feb. 16, 2006

(30) Foreign Application Priority Data

Aug. 13, 2004 (TW) ................................. 93124443

(51) Int. Cl.
*G02B 15/14* (2006.01)

(52) U.S. Cl. ...................................................... 359/689

(58) Field of Classification Search ................ 359/683, 359/689

See application file for complete search history.

(56) References Cited

U.S. PATENT DOCUMENTS

| | | | | |
|---|---|---|---|---|
| 6,308,011 | B1 | 10/2001 | Wachi et al. | |
| 6,538,824 | B1 * | 3/2003 | Mihara et al. | 359/684 |
| 6,597,513 | B1 | 7/2003 | Minefuji | |
| 6,611,386 | B1 | 8/2003 | Tanaka | |
| 2002/0051301 | A1 * | 5/2002 | Noguchi et al. | 359/689 |

FOREIGN PATENT DOCUMENTS

JP 2003-5072 A 1/2003

* cited by examiner

*Primary Examiner*—Scott J. Sugarman
(74) *Attorney, Agent, or Firm*—Birch, Stewart, Kolasch & Birch, LLP

(57) ABSTRACT

A zoom lens for digital image capturing apparatus is a shared lens of digital static cameras and digital video cameras. It contains three lens groups. From the object plane to the image plane, the first lens group has a negative refractive power, the second lens group has a positive refractive power, and the third lens group has a positive refractive power. As the focal length of the zoom lens changes from long (telescope) to short (wide-angle), the second lens group moves from the object plane to the image plane. The third lens group and the first lens group move with the second lens group.

11 Claims, 1 Drawing Sheet

ZOOM LENS FOR DIGITAL IMAGE CAPTURING APPARATUS

BACKGROUND OF THE INVENTION

1. Field of Invention

The invention relates to a zoom lens for digital image capturing devices, such as digital static cameras and digital video cameras. In particular, it relates to a zoom lens with a more compact structure, a higher picture quality, a high resolution, and a wider angle. The disclosed zoom lens further has the properties of a high relative illumination and a small incident angle. This is particularly suitable for devices capturing digital images, such as CCD.

2. Related Art

In recent years, the research and production of zoom lenses have made a great progress. Besides advances in their performance, the zoom lenses are also designed for the convenience of users. Manufacturers make all efforts to lower the lens production cost and decrease the lens set length in order to enhance their competitive power. In particular, the zoom lenses for the digital static camera (DSC) and the digital video camera (DVC) have the greatest market potential.

In the prior art such as the U.S. Pat. No. 6,611,386, JP Pub. No. 2003-5072, U.S. Pat. No. 6,597,513, and U.S. Pat. No. 6,308,011, people always try to achieve minimizing the lens sets by reducing the number of lenses. However, they cannot provide the desired properties such as large F/#, large field of view (FOV), the zoom ratio, and the number of lenses. Take F/# as an example, its usual value of a normal DSC lens set is 2.8, whereas that of the DVC lens set is required to be 1.8. One thus sees that there is room to improve.

The U.S. Pat. No. 6,611,386 adopts the design of six lens pieces and can only reach: zoom ratio=2.5, F/#=2.8, and FOV (2ω)=63 degrees. The JP Pub. No. 2003-5072 adopts the design of seven lens pieces, achieving: zoom ratio=3, F/#=2.5, and the largest FOV (2ω)=65 degrees. The U.S. Pat. No. 6,597,513 also adopts the seven-piece design, with the zoom ratio=2.5~4, F/#=2.8, and the largest FOV (2ω) =60 degrees. The U.S. Pat. No. 6,308,011 also adopts the seven-piece design, with the zoom ratio=3, F/#=2.8, and the largest FOV (2ω)=64 degrees.

Therefore, it is necessary to provide a small zoom lens that has the properties of high brightness, wide angle, and homogeneity.

SUMMARY OF THE INVENTION

An objective of the invention is to provide a zoom lens for DSC and DVC. It does not only increase the brightness, angle, homogeneity of the lens set, but also reduces the number of lenses, rendering a small zoom lens. Moreover, it provides the desired optical quality of a large number of pixels and a high resolution.

According to the objective, the invention discloses a zoom lens for digital image capturing apparatus with three lens groups. From the object plane to the image, the first lens group has a negative refractive power, the second lens group has a positive refractive power, and the third lens group has a positive refractive power. As the focal length of the zoom lens changes from long (telescope) to short (wide-angle), the second lens group moves from the object plane to the image plane. The third lens group and the first lens group move with the second lens group.

The disclosed zoom lens design enables an appropriate control of aberrations. The distortion of images is controlled under ±1%, satisfying the optical quality requirements of a large number of pixels and a high resolution for digital cameras.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1A:
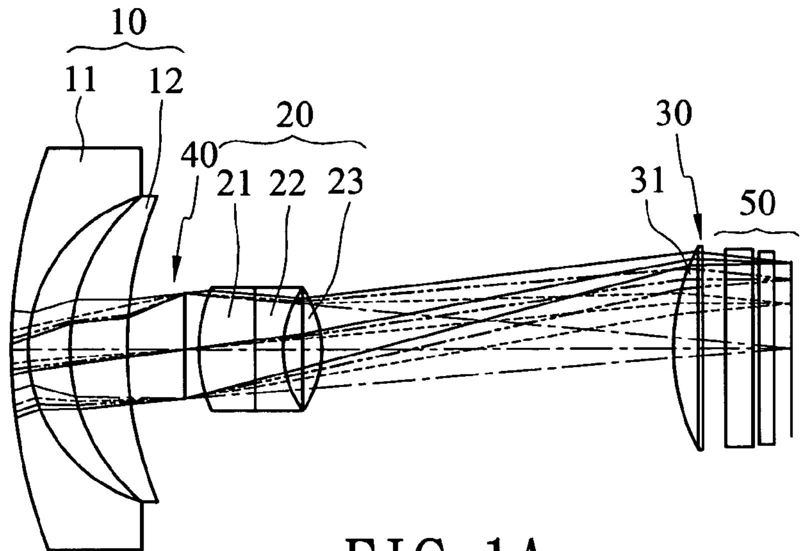
FIGS. 1A to 1C are schematic views of the disclosed zoom lens in its telescope, middle, and wide-angle ends, respectively.
Figure 1B:
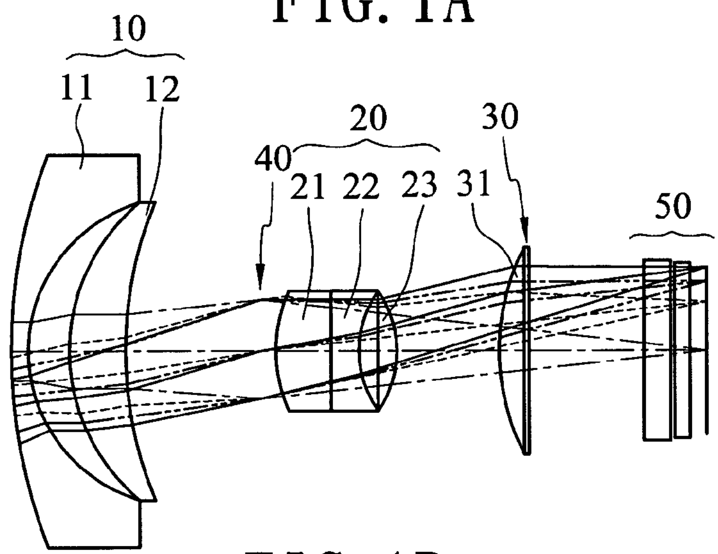
Figure 1C:
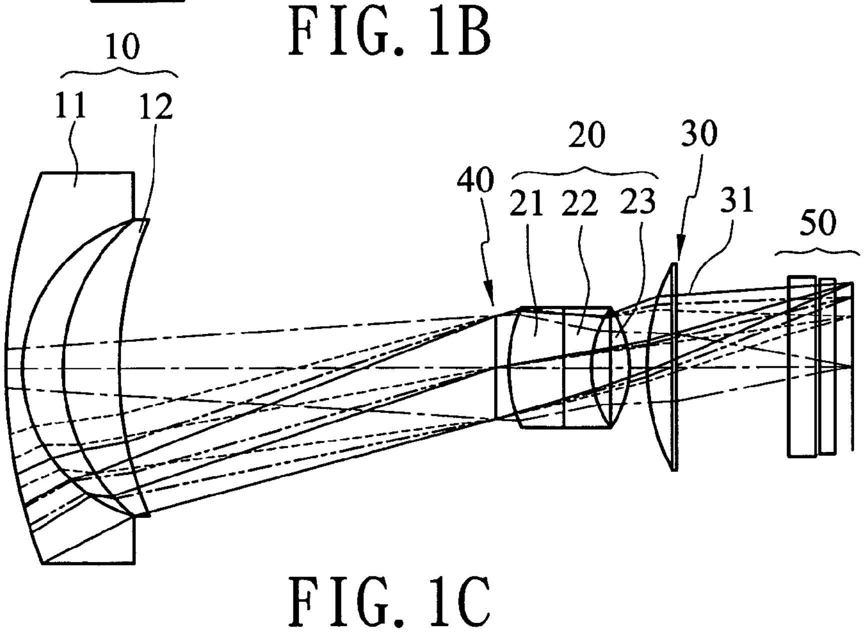

As shown in FIGS. 1A to 1C, the disclosed zoom lens, from an object plane (whose image is to be taken) its image plane, has a first lens group 10, a second lens group 20, and a third lens group 30. The first lens group 10 has a negative refractive power, the second lens group 20 has a positive refractive power, and the third lens group 30 has a positive refractive power.

As shown in the drawing, this embodiment of the invention only uses six pieces of lenses. The total length of the lens set is thus shortened.

In this embodiment, the first lens group 10 has a first lens 11 and a second lens 12. The second lens group 20 contains a third lens 21, a fourth lens 22, and a fifth lens 23. The third lens group 30 includes a sixth lens 31.

In the first lens group 10, the first lens 11 is a negative lens, the second lens 12 is a positive lens. The surface of the first lens 11 closer to the image plane and the surface of the second lens 12 closer to the image plane have non-spherical designs to correct spherical aberrations, comas, and astigmatisms. The mathematical expression of a non-spherical lens can be written as:

$$Z = \frac{cy^2}{1 + \sqrt{1 - (1+k)c^2y^2}} + A_4y^4 + A_6y^6 + A_8y^8 + A_{10}y^{10}$$

where Z is the sag quantity at the position with a height y relative to the lens central axis; c is the reciprocal of the curvature radius of the lens axis; y is the relative height to the lens axis; k is a conic constant of the lens; and A4, A6, A8, and A10 are the non-spherical higher order coefficients of the lens.

In the second lens group 20, the third lens 21 is a positive lens and its surface closer to the object plane is non-spherical. The fourth lens 22 is a negative lens. Both of them combine to form a positive cemented lens to correct axial aberration. The fifth lens 23 is a positive lens.

The sixth lens 31 in the third lens group 30 is a positive lens.

The refractive power arrangement of the disclosed zoom lens (i.e. the first lens group 10, the second lens group 20, and the third lens group 30 have negative, positive, and positive refractive powers, respectively) is such that the arrangement of the first lens group 10 (negative, positive) has a main focal point in the back, shortening the whole length. The refractive power arrangements of the first lens group 10 and the second lens group 20 are such that their main focal points are close to each other, minimizing the lens set. Moreover, the refractive power arrangement of the fifth lens 23 in the second lens group 20 determines the main focal point of the second lens group 20, rendering an efficient design of the lens set.

The use of three non-spherical surfaces in the invention enables F/# to reach 2.5 without vignetting.

The stop 40 is located between the second lens group 20 and the third lens group 30. As the focal length of the zoom lens varies, the relative positions between the stop 40 and the second lens group 20 are fixed. That is, the stop 40 moves along with the second lens group 20.

Moreover, the invention further includes a photosensitive element 50 which may be a Charge-Coupled Device (CCD) or Complementary Metal-Oxide Semiconductor (CMOS) to receive the light and transform the light to analog signals.

When the focal length of the zoom lens changes from long (telescope) to short (wide-angle), the second lens group 20 along with the stop 40 moves from the object plane toward the image plane (to the right of the drawing). The first lens group 10 and the third lens group 30 make the corresponding motion too. In addition, the third lens group 30 is a focusing lens.

The disclosed zoom lens has to satisfy the following conditions:

$$y/Trw>0.1$$

$$0.23<y/epw<0.28$$

$$y/fw>0.74$$

$$0.6<(R23+R24)/(R23-R24)<1.14$$

$$2.09<T11/D11<5.85$$

$$0.53<f11/f1<0.61$$

where y is the image plane height; Trw the total length of the zoom lens at its short focal length; epw is the eye piece position of the zoom lens at its short focal length; fw is the equivalent focal length of the zoom lens at its short focal length; R23 is the curvature radius of the surface of the fifth lens 23 in the second lens group 20 that is closer to the object plane; R24 is the curvature radius of the surface of the fifth lens 23 in the second lens group 20 that is closer to the image plane; T11 is the boundary thickness of the first lens 11 in the first lens group 10; D11 is the central thickness of the first lens 11 in the first lens group 10; f11 is the equivalent focal length of the first lens 11 in the first lens group 10; and f1 is the equivalent focal length of the first lens group 10.

To help explaining the implementation of the invention, we provide some numerical results of test in Tables 1 to 6.

TABLE 1

| | Test 1 |
|---|---|
| y/Trw | 0.102255398 |
| y/fw | 0.75199401 |
| y/epw | 0.258704885 |
| T11/D11 | 5.8521025 |
| (R23 + R24)/(R23 − R24) | 1.144905087 |
| f11/f1 | 0.530279227 |

TABLE 2

| | Test 2 |
|---|---|
| y/Trw | 0.104409722 |
| y/fw | 0.740949782 |
| y/epw | 0.260338377 |
| T11/D11 | 5.6524125 |
| (R23 + R24)/(R23 − R24) | 1.142901824 |
| f11/f1 | 0.541368109 |

TABLE 3

| | Test 3 |
|---|---|
| y/Trw | 0.102222222 |
| y/fw | 0.766666667 |
| y/epw | 0.277869025 |
| T11/D11 | 4.951850954 |
| (R23 + R24)/(R23 − R24) | 0.577892838 |
| f11/f1 | 0.568140714 |

TABLE 4

| | Test 4 |
|---|---|
| y/Trw | 0.1034958 |
| y/fw | 0.75093 |
| y/epw | 0.234073249 |
| T11/D11 | 3.078923851 |
| (R23 + R24)/(R23 − R24) | 0.261148742 |
| f11/f1 | 0.560891273 |

TABLE 5

| | Test 5 |
|---|---|
| y/Trw | 0.1029894 |
| y/fw | 0.74083 |
| y/epw | 0.263782825 |
| T11/D11 | 2.093113134 |
| (R23 + R24)/(R23 − R24) | 0.649914943 |
| f11/f1 | 0.614532679 |

TABLE 6

| | Test 6 |
|---|---|
| y/Trw | 0.104973 |
| y/fw | 0.740293 |
| y/epw | 0.225266255 |
| T11/D11 | 2.233588333 |
| (R23 + R24)/(R23 − R24) | 0.27206309 |
| f11/f1 | 0.606888352 |

EFFECTS OF THE INVENTION

The invention provides a more compact zoom lens while at the same time satisfying the optical requirements of a large number of pixels and a high resolution. It further has the following advantages:

It reduces the number of lenses (six pieces in the current design), thereby reducing the total weight and the production cost of the zoom lens.

It resolves the problem of reducing the size of the zoom lens (with a total length smaller than 22 mm). The disclosed zoom lens is therefore suitable for middle-level digital cameras.

It further enhances the brightness, viewing angle, and homogeneity of the lens. In particular, the image plane height is 2.3 mm (equivalent to a ¼" photo-sensitive device). It has a whole FOV modulation transfer function (MTF) of 1001 p/mm, reaching above 40%. The relative illumination (RI) of the largest FOV from the telescope end to the wide-angle end is always larger than 80%. It can provide 3× zooming. Its FOV(2ω) equals 75 degrees, and F/# can reach 2.5. The largest main incident angle on the image plane surface is less than 15 degrees.

Certain variations would be apparent to those skilled in the art, which variations are considered within the spirit and scope of the claimed invention.

What is claimed is:

1. A zoom lens comprising, from an object plane to its image plane, a first lens group, which has a negative refractive power;

a second lens group, which has a positive refractive power; and a third lens group, which has a positive refractive power;

wherein as the second lens group moves from the object plane toward the image plane, the third lens group and the first lens group move with the second lens group, making the focal length of the zoom lens vary from long to short, and the zoom lens satisfies the following conditions:

$$y/Trw>0.1$$

$$0.23<y/epw<0.28$$

$$y/fw>0.74$$

$$0.6<(R23+R24)/(R23-R24)<1.14$$

$$2.09<T11/D11<5.85$$

$$0.53<f11/f1<0.61$$

where y is the image plane height; Trw is the total length of the zoom lens at its short focal length; epw is the eye piece position of the zoom lens at its short focal length; fw is the equivalent focal length of the zoom lens at its short focal length; R23 is the curvature radius of the surface of a lens in the second lens group that is closer to the object plane; R24 is the curvature radius of the surface of the lens in the second lens group that is closer to the image plane; T11 is the boundary thickness of a lens in the first lens group; D11 is the central thickness of the lens in the first lens group; f11 is the equivalent focal length of the lens in the first lens group; and f1 is the equivalent focal length of the first lens group.

2. The zoom lens of claim 1, wherein the first lens group contains, from the object plane to the image plane, a first lens and a second lens, where the first lens is a negative lens and the second lens is a positive lens.

3. The zoom lens of claim 2, wherein the surface of the first lens that is closer to the image plane is non-spherical.

4. The zoom lens of claim 2, wherein surface of the second lens that is closer to the image plane is non-spherical.

5. The zoom lens of claim 1, wherein the second lens group contains, from the object plane to the image plane, a third lens, a fourth lens, and a fifth lens, where the fifth lens is a positive lens.

6. The zoom lens of claim 5, wherein the surface of third lens that is closer to the object plane is non-spherical.

7. The zoom lens of claim 1, wherein the second lens group further contains a cemented lens.

8. The zoom lens of claim 1 further comprising a stop located between the first lens group and the second lens group.

9. The zoom lens of claim 8, wherein the second lens group has a fixed relative position with the stop as the focal length of the zoom lens varies.

10. The zoom lens of claim 1, wherein the third lens group contains a sixth lens which is a positive lens.

11. The zoom lens of claim 1, wherein as the focal length of the zoom lens varies from long to short the relative illumination of the largest FOV on the image plane surface is greater than 80%.

* * * * *